United States Patent

Page et al.

[15] 3,669,060

[45] June 13, 1972

[54] MASK CHANGING MECHANISM FOR USE IN THE EVAPORATION OF THIN FILM DEVICES

[72] Inventors: Derrick J. Page, Export; Paul O. Raygor, Irwin, both of Pa.

[73] Assignee: Westinghouse Electric Corporation, Pittsburgh, Pa.

[22] Filed: Sept. 24, 1970

[21] Appl. No.: 75,217

[52] U.S. Cl. ....................118/7, 118/6, 118/48

[51] Int. Cl. ....................C23c 13/12

[58] Field of Search ....................118/7, 8, 4, 9, 48–49.5, 118/504, 505

[56] References Cited

UNITED STATES PATENTS

| | | | |
|---|---|---|---|
| 3,023,727 | 3/1962 | Theodoseau et al | 118/9 |
| 3,117,024 | 1/1964 | Ross | 118/49 |
| 3,117,025 | 1/1964 | Learn et al | 118/49 |
| 3,206,322 | 9/1965 | Morgan | 118/49.1 X |
| 3,207,126 | 9/1965 | Byron | 118/49 |
| 3,238,918 | 3/1966 | Radke et al | 118/49.1 |
| 3,302,609 | 2/1967 | Walker et al. | 118/49 |
| 3,312,190 | 4/1967 | Bradshaw | 118/49.1 |
| 3,314,395 | 4/1967 | Hemmer | 118/49 |
| 3,336,898 | 8/1967 | Simmons et al | 118/49 |
| 3,352,282 | 11/1967 | Schweitzer | 118/49 |

OTHER PUBLICATIONS

Steiner, German Printed Application No. St.5626 VI/48b, 3–1956, 1 sheet dwg, 3 pgs. Spec.

*Primary Examiner*—Morris Kaplan
*Attorney*—F. Shapoe and Lee P. Johns

[57] ABSTRACT

Apparatus for changing a mask used in the evaporation of thin film electronic components formed on flexible substrates by vapor deposition techniques, whereby a number of masks are successively brought into registration with a substrate for sequentially depositing a series of thin films of selected materials including semiconducting, insulating, or conducting materials through the mask onto the substrate. The apparatus is particularly concerned with alignment pins for enabling registration of successive patterns to be vacuum evaporated successively onto one area of a flexible substrate tape with an accuracy of $\pm 1\mu$. The area of the substrate tape may be changed and the process repeated time after time without opening the vacuum system.

15 Claims, 8 Drawing Figures

MASK CHANGING MECHANISM FOR USE IN THE EVAPORATION OF THIN FILM DEVICES

CROSS-REFERENCES TO RELATED APPLICATIONS

This application is related to application Ser. No. 745,039, filed July 15, 1968; and Ser. No. 747,064, filed June 24, 1968, now abandoned.

BACKGROUND OF THE INVENTION

1. Field of the Invention

This invention relates to thin electronic components such as semiconductor devices and more particularly it pertains to apparatus for making them.

2. Description of the Prior Art

In the production of thin film devices, it is necessary to bring a number of masks successively into precise registration with a substrate. The registration of each mask relative to the substrate must be within a fine tolerance of the order of 1 micron. The difficulty of that procedure is compounded by the fact that when movement of the masks is carried out in vacuum, all motions must be transmitted through vacuum-sealed feed-throughs. In the past, various attempts have been made to achieve registration of successive masks with a substrate with the desired accuracy. However, when operating in a vacuum an accuracy of one micron has not been attainable repeatedly.

When operating in a vacuum, there are no gases present to enable metal parts to otherwise slide over each other in the manner known under normal atmospheric conditions. The metal parts in vacuum bind and resist sliding. Moreover, in high vacuum conditions most lubricants cannot be used, because they have vapor pressures which cause contamination.

SUMMARY OF THE INVENTION

It has been found in accordance with this invention that a plurality of masks arranged in a series for sequential presentation are presented at a vapor deposition station successively on a substrate with accurate registration, the apparatus for obtaining that registration includes a holder for a substrate which holder includes a pair of vertically disposed pins which are lowered into a pair of pin-receiving apertures associated with each mask, the pins and apertures having very close tolerances, and the substrate holder being lowered and raised from the deposition station upon the presentment of each successive mask. Moreover, the apparatus includes means for raising and lowering the substrate holder to and from the deposition station which means includes a lever and trunions extending from opposite sides of the substrate holder, whereby the pins are retained in substantial alignment with the apertures throughout the operation of the vapor deposition process. In addition, the apparatus includes means for moving each mask successively into the deposition station.

BRIEF DESCRIPTION OF THE DRAWINGS

Similar numerals refer to similar parts throughout the several views of the drawings.

DESCRIPTION OF THE PREFERRED EMBODIMENTS

Figure 1:
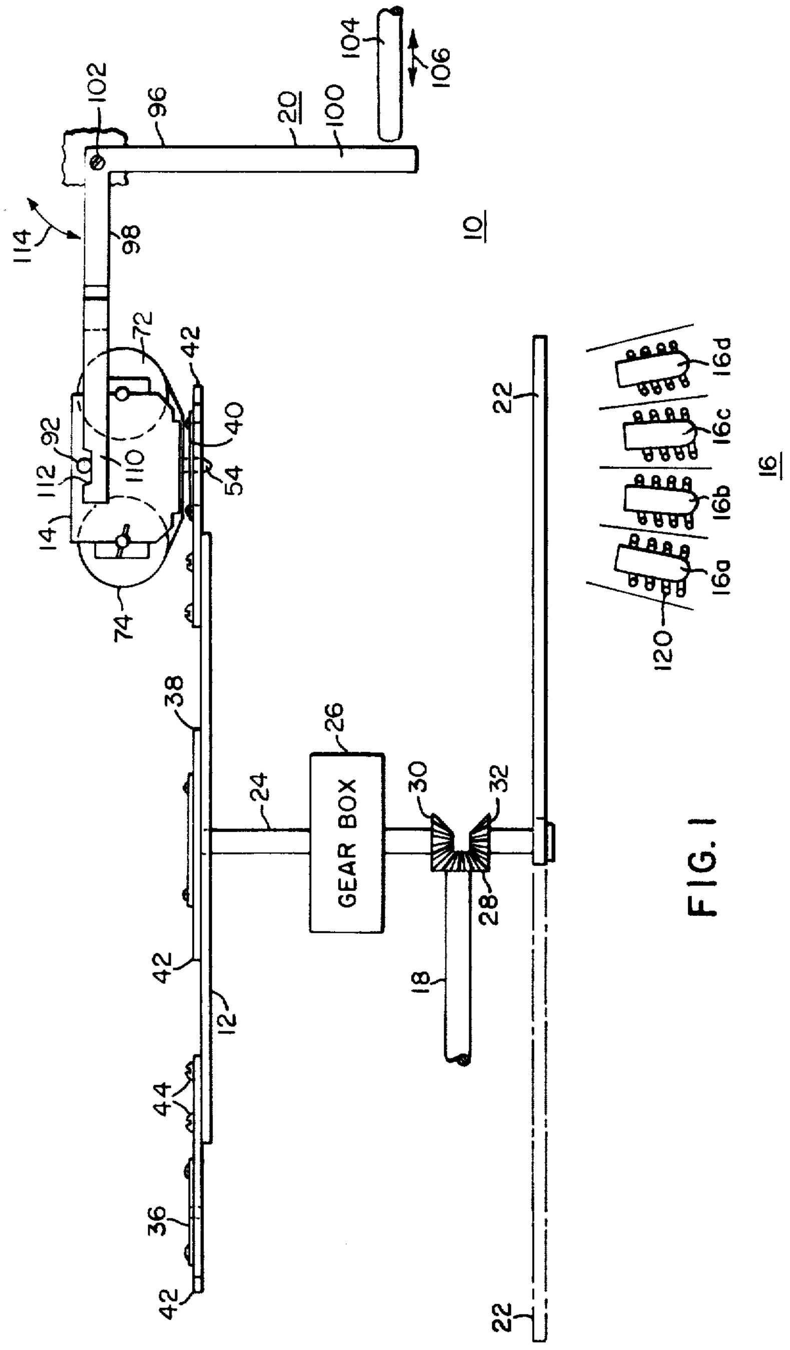
FIG. 1 is a schematic view of a mask changing mechanism embodying the present invention.

The apparatus is generally indicated at 10 in FIG. 1. It includes mask-mounting means 12, a substrate carrier 14, sources 16 of material to be deposited, means 18 for rotating the mask mounting means 12, means 20 for raising and lowering the carrier 14, a shutter 22, and walls (not shown) for forming a vacuum chamber containing the foregoing elements.

The mask mounting means 12 is a rotatable member or mask holding wheel (FIG. 2) which is horizontally disposed and mounted on a rotatable shaft 24. The shaft 24 is driven by a Geneva gear box generally indicated at 26 (FIG. 1) which moves the wheel 12 intermittently through a series of arcs equal to the number of masks mounted on the wheel 12. The gear box 26, in turn, is driven by means such as a motor (not shown) through the rotation means or shaft 18 and through beveled gears 28 and 30, the former of which also actuates a beveled gear 32 for turning a shutter 22.

Figures 2, 5:
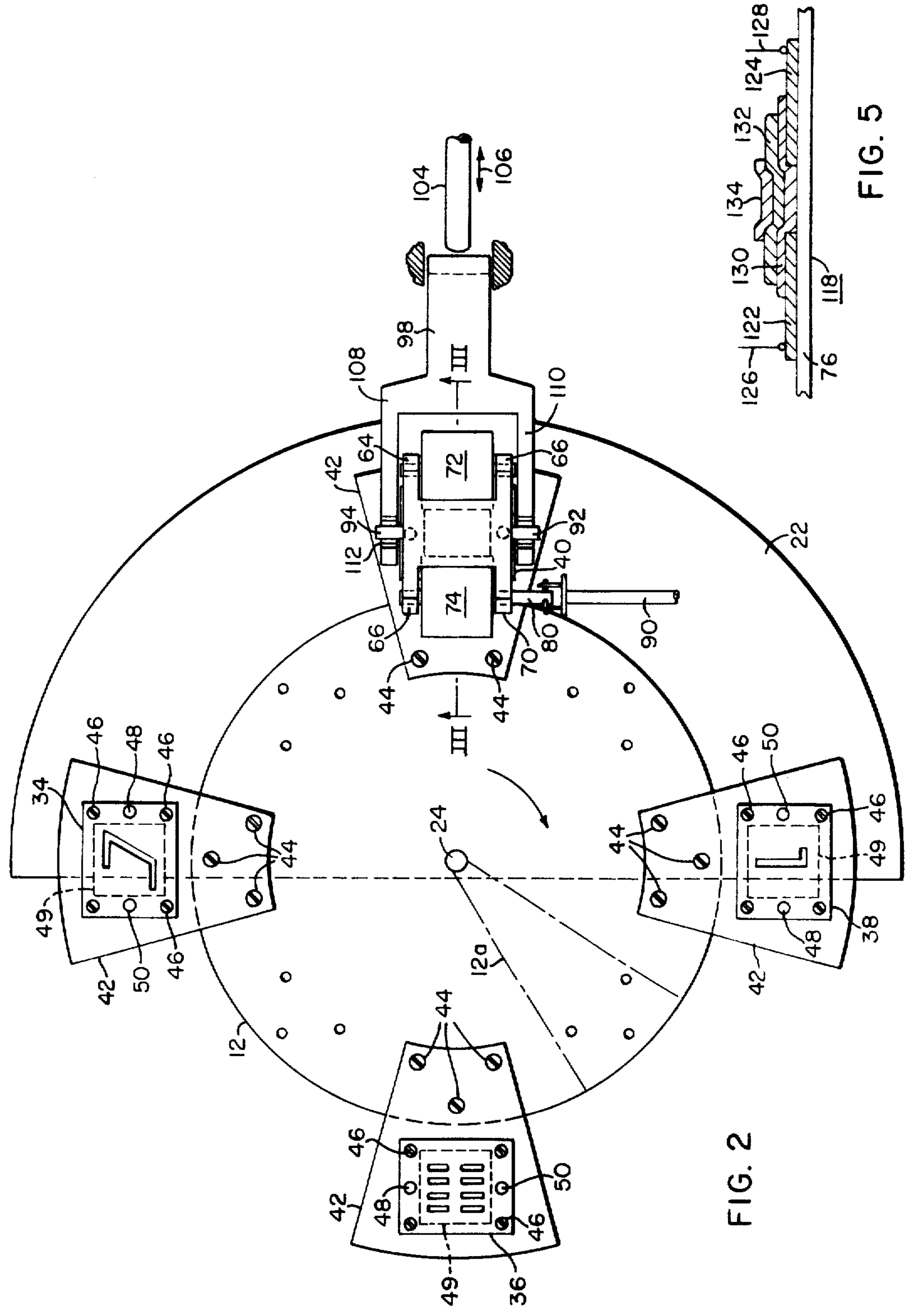
FIG. 2 is a plan view of the mechanism shown in FIG. 1.
FIG. 5 is a side view in cross-section, of a semiconductor device produced in accordance with this invention.

As shown more particularly in FIG. 2, the shutter 22 is an arcuate member such as a semi-circular sheet-like member which is disposed between the sources 16 of deposition material and the substrate carrier 14. Thus, as one mask after another is brought under the carrier 14, the same drive shaft for the wheel 12 also operates the shutter 22, whereby the latter can be controlled during the "dead space" of the Geneva gear box 26.

In the alternative, the mechanical elements for rotating the wheel 12 and shutter 22 including the Geneva gear box 26 may be replaced by electrical means such as the servomotors with an externally calibrated positioning device including a photocell, thereby obviating the need for vacuum seals for extending mechanical elements such as rotatable shafts through the vacuum barrier.

In FIGS. 1 and 2, a plurality of evaporation masks 34, 36, 38, and 40 are disposed of equally spaced intervals on the periphery of the wheel 12. The masks are mounted in place on similar mask holders or frames 42. Any number of mask holders 42 may be provided and they are attached to the wheel 12 in a suitable manner such as by bolts 44.

Figure 4:
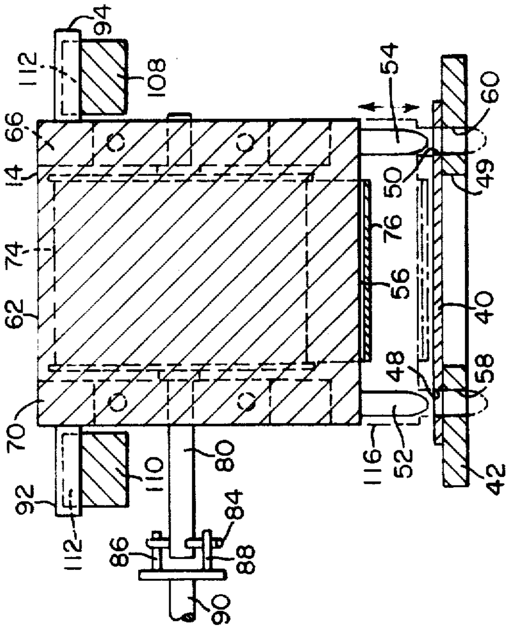
FIG. 4 is a vertical sectional view taken on the line IV—IV of FIG. 3.

The several masks 34–40 are precisely mounted in place on their respective frames 42 by suitable means such as bolts 46 so that the pattern of each mask is disposed over an opening 48, thereby presenting the pattern of the particular mask precisely in position at the deposition station; namely, under the substrate carrier 14. To precisely locate the patterns of the several masks 34–40 with respect to each other at the deposition station, the masks and carrier 14 are provided with alignment means which includes hole means and preferably two holes 48 and 50 (FIG. 2) which receive a pair of spaced alignment pins 52 and 54, respectively, extending from an under surface 56 of the substrate carrier 14. As shown in FIG. 4, the holes 48 and 50 are aligned with a pair of holes 58 and 60 in the mask holder 42, whereby the entire length of the pins 52 and 54 are received when the substrate carrier 14 is lowered therein in a manner to be described hereinbelow. It is understood that the pins 52 and 54 may be interchanged with the holes 58 and 60.

In order to attain the desired tolerance of one micron in locating the series of masks in place at the deposition station, the locating pins 52 and 54 are polished to a precise dimension that is substantially equal to the diameter of the holes 48 and 50. To facilitate engagement and disengagement of the pins 52 and 54 with their respective holes the lower end portions of the pins are preferably tapered.

The substrate carrier 14 includes a center portion 62 having the under surface 56, two pairs of oppositely extending arms or flange-like portions 64, 66, 68, and 70 and a pair of reels 72 and 74. The reels 72 and 74 contain an elongated strip of flexible material such as a film or tape 76 composed of a suitable substrate material. In the alternative, the substrate tape 76 may be an unflexible plate such as glass. However, where more than one electronic component is to be made, the use of a roll of flexible substrate 76 is preferred in order to take advantage of the overall system for repeated use of the masks in a sequential manner without interrupting the vacuum system enclosing the same.

The tape 76 is mounted on the supply reel 72 from where it extends over and across the surface 56 to the take-up reel 74. The reels are mounted on shafts 78 and 80 which shafts are retained in place on the ends of the arms 64–70 by similar retainer members 82.

After a given area of the tape 76 is exposed to vapor deposition through the several masks 34–40, the take-up reel 74 is rotated counterclockwise by means of the shaft 80 which has a radially extending pin 84 which pin is engaged by a pair of pins 86 and 88 on the end of a shaft 90.

The substrate carrier 14 is pivotally mounted over the deposition station, that is, above the mask 40, whereby the pins 52 and 54 are maintained in substantial alignment with the corresponding holes 48 and 50 in the several masks 34–40. The carrier 14 may be balanced or suspended in any suitable manner such as by a pair of trunions 92 and 94 which extend from opposite sides of the carrier in a position substantially above the center of gravity of the carrier and preferably in a plane passing through the axis of the pins 52 and 54.

The means 20 for raising and lowering the substrate carrier 14 is preferably a lever, such as a bell crank 96 (FIG. 1), having a horizontal portion 98, a vertical portion 100, and a fulcrum 102. An actuating bar 104 is applied to the lower end of the portion 100 and moves reversely as indicated by an arrow 106. As shown in FIG. 2, the portion 98 is bifurcated at the left end and includes arms 108 and 110. The upper surface of each arm is provided with a notch 112 in which the trunions 92 and 94 are slidably disposed for limited movement. Each notch 112 serves to limit the lateral movement of the pins 92 and 94 and thereby maintain alignment of the pins 52 and 54 with the holes 48 and 50.

Figure 3:
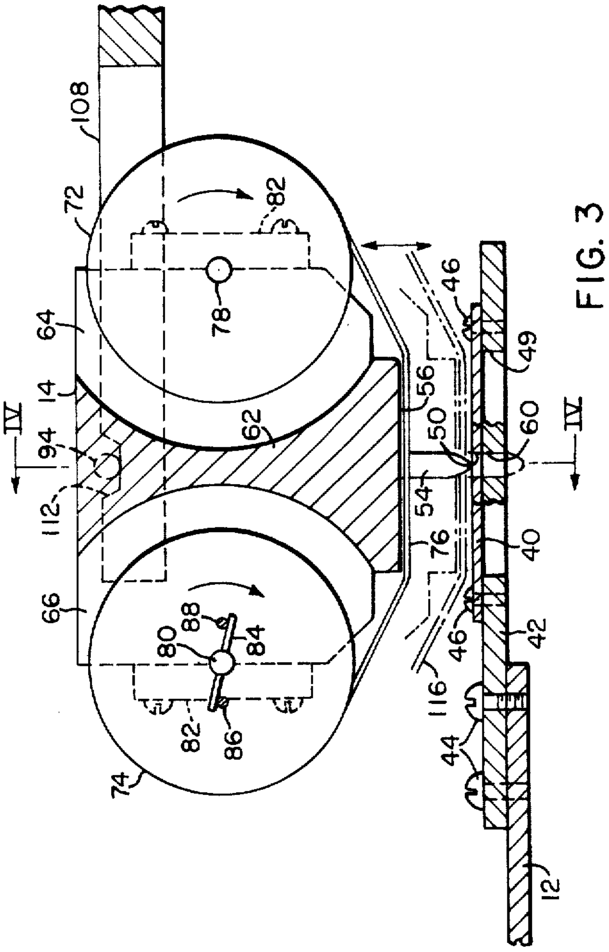
FIG. 3 is an enlarged vertical sectional view taken on the line III—III of FIG. 2.

Accordingly, as the bar 104 is moved to the left (as viewed in FIG. 1), the bell-crank 96 is rotated clockwise (as indicated by the arrow 114), causing the substrate carrier 14 to be lifted until the lower ends of the pins 52 and 54 clear the upper surface of the mask 40. Conversely, as the bar 104 is moved to the right (as viewed in FIG. 1), the bell crank 96 rotates counterclockwise (as shown by the arrow 114), whereupon the carrier 14 is lowered until the tape 56 is brought into contact with the mask 40 as indicated by the broken lines 116 (FIG. 3).

In order to produce a satisfactory thin film device the masks 34–40 are accurately located on the mask holders 42. Each mask 34–40 is secured in place by bolts 46. Evaporations through the several masks are then made onto a test plate through the masks 34. The resultant pattern is then used as a standard to align the remaining masks 36–40. Fine adjustments are made to each mask 36–40 by observing with a microscope the standard evaporated pattern through the mask to be aligned. The mask is then moved into position and the bolts 46 are tightened to firmly secure it to the mask holding frame 42.

In operation, a thin film device 118, as shown in FIG. 5, is produced substantially in the following manner: the actuating bar 104 is moved to the left (as viewed in FIG. 1) in order to raise the substrate carrier 14 to the solid line position shown in FIG. 3. The rotation means 18 is then actuated to place the first mask such as mask 40 in the deposition station beneath the carrier 14, with the shutter 22 in the solid line position shown in FIG. 1. The actuating bar 104 is then moved to the right (as viewed in FIG. 1) in order to lower the substrate tape 76 onto the mask 40, as shown by the broken line position 116. An appropriate evaporation source 16*a* is then heated by suitable means such as a resistance heating coil 120. When the evaporation temperature for the evaporation source which may be composed of any metal such as gold or aluminum, is at a temperature suitable for the particular evaporation rate of the metal being deposited, the shutter 22 is moved to its broken line position as shown in FIG. 1 and from its position between the evaporation source 16*a* and the deposition station. When the desired thickness of a layer 122 (FIG. 5) of a source drain such as gold is vapor deposited, the shutter 22 is returned to the position between the evaporation source 16*a* and the deposition station, and the heating coil 120 is turned off.

Thereafter the substrate carrier 14 is raised and the next mask 34 is brought into position to replace the mask 40 by rotation of the mask mounting means 12 and the foregoing procedure is repeated, whereby another source 16*b*, 16*c*, or 16*d* is evaporated. In that manner, each evaporation step is made in turn until a complete device 118 is completed.

More particularly, the thin film device or semiconductor 118 in FIG. 5 consists of the flexible substrate 76, the source electrode 122, drain electrode 124 having leads 126 and 128, respectively, a layer of insulation material 130, a layer of semiconductor material 132, and a gate contact or electrode 134.

The flexible substrate 76 may be of any flexible material such as for example, paper, polyethylene, terephthlate sold commercially under the trademark Mylar; esters and ethers of cellulose such as ethyl cellulose; cellulose acetate; and cellulose nitrate; regenerated cellulose such as cellophane; polyvinyl chloride; polyvinyl chloride-acetate; polyvinylidene chloride, sold commercially under the trademark Saran; nylon film polyimide and polyamide-imide films, polytetrafluoroethylene, sold commercially under the trademark Teflon, polytrifluoromonochloroethylene, sold commercially under the trademark Kel F; and flexible tapes and foils of the metals: nickel, aluminum, copper, tin, tantalum and base alloys of any of these, and ferrous base alloys such for example as thin gauge stainless steel strip.

The paper may be of any type and surface texture, either rough or smooth, as for example, rag paper, wood pulp paper, alpha cellulose paper, kraft paper and the like. As illustrations, the semiconductor devices of this invention have been produced with playing cards, writing stationery, and newspaper as the substrate.

The term "flexible," as used in describing the substrate, means a material that can be wrapped around a mandrel of, at the maximum, one inch in diameter and preferably a mandrel of the order of one-eighth inch in diameter using such flexible substrates having field effect transistor (FET) of the type shown in FIG. 5, they have been bent into radii as small as one-sixteenth inch without degradation of operating characteristics.

With reference again to FIG. 5, the source electrode 122 and drain electrode 124 are disposed upon the flexible substrate 76 and spaced apart from each other. The distance between the source and drain electrodes is not critical and depends on the properties desired. The source electrode 122 and drain electrode 124 may be of any suitable electrically conductive metal, such as a metal selected from the group consisting of gold, silver, aluminum, nickel, and base alloys thereof. The source electrode 122 and drain electrode 124 should have a thickness sufficient to insure their functioning as ohmic contacts. A thickness of from 80 A to 3,000 A and preferably from 100 A to 300 A has been found satisfactory for most devices.

The layer 130 is in contact with and extends between the source electrode 122 and drain electrode 124. Preferably the layer 130 partially overlaps the electrodes 122 and 124.

The insulation layer 130 may be comprised of a suitable electrical insulating material selected from the group consisting of inorganic insulators such as silicon monoxide, silicon dioxide, aluminum oxide, calcium fluoride, magnesium fluoride, and polymerizable organics such as polymers of hexachlorobutadiene, divinyl benzene, aryl sulfones, fluorinated alkenyls (e.g. polytetrafluoroethylene) and para-xylene.

The insulation layer 20 should be as thin as possible so that modulation can be produced in the device current at a relatively low voltage. However, the layer must serve as an adequate electrical insulator. A layer of 100 A has occasionally been found to contain pin holes which adversely affect the electrical insulation function of the layer. A thickness of about 300 A appears to be the minimum thickness which will ensure that there are no pin holes while 1,000 A appears to be optimum between a void free insulation layer and low voltage modulation. As the operating voltage of the device increases to 100 volts, a thickness of about 3,000 A is desirable and at an operating voltage of 200 volts a thickness of about 5,000 A to 6,000 A is desirable. The layer 130 may be single crystal, polycrystalline, or amorphous.

The semiconductor layer 132 may vary from an average thickness of 40 angstroms to several thousand angstroms for the wider band gap materials such as cadmium sulfide and cadmium selenide. The layer 132 may consist of a semiconductor material, such as, tellurium cadmium sulfide, cadmium selenide, silicon, indium arsenide, gallium arsenide, tin oxide, and lead telluride.

The layer 132 may not completely cover the layer 130 and extend from the source electrode 122 to the drain electrode 124, it need only separate the gate electrode 134 from the insulation layer 130.

The gate electrode 132 is disposed on the layer 132 between the source electrode 122 and the drain electrode 124. The gate electrode 132 consists of a good electrically conductive metal such as a metal selected from the group consisting of aluminum, copper, tin, silver, gold, and platinum. To ensure that the gate electrode 132 provides a high conductivity, it should have a thickness of from 300 A to 1,000 A and preferably from 500 to 1,000 A.

Field effect transistors of the type shown in FIG. 5 have stable operating characteristics and have worked at frequencies up to 60 MHz. Such transistors have been operated fro over 1,000 hours without any substantial measurable change of characteristics.

The device of this invention can be used for any application that does not require high power, very high frequency or high temperature. The devices have been used in cascade amplifiers, down-converter and oscillator circuits.

Devices of the type shown in FIG. 5 have been found to have the following performance characteristics:

Transconductance — About 6,000 micro-mhs at 4 ma drain current.

Operating Temperature — Up to 150° C ambient. Maximum Source-Drain Voltage — Over 200 volts.

Operation of the several movements including the shaft 90, the bar 104, and the rotation means 18 may be either by manual or automatic manipulation. The rotation means 18, the shaft 90, and the rod 104 have external control devices outside of the walls forming the vacuum chamber which controls are operatively connected to the parts within the vacuum chamber in a conventional manner such as by the use of magnetic fields. Where the system is set-up for automatic operation, it may be controlled by the use of magnetic tape or computer means.

The several sources **16*a*, 16*b*, 16*c*, and 16*d* of deposition material correspond to the materials of which the layers 122 and 124, are composed as well as the insulation layer 130, the semiconductor layer 132, and the gate contact 134**, respectively.

Figure 6:
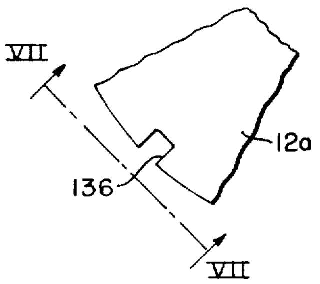
FIG. 6 is a fragmentary view of any sector of the masking wheel.
Figure 7:
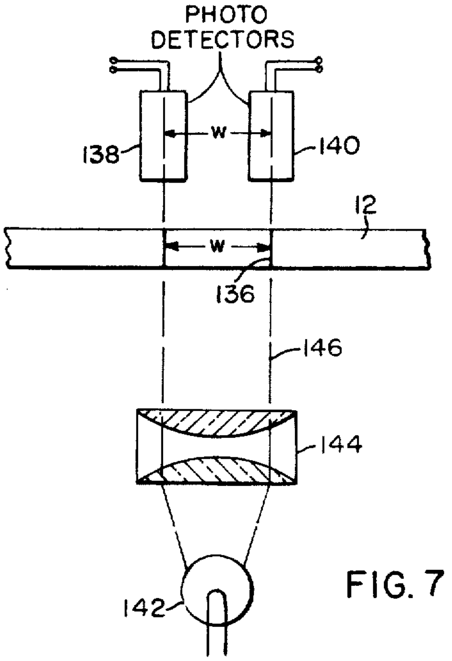
FIG. 7 is an elevational view taken on the line VII—VII of FIG. 6 and showing additional operative means.
Figure 8:
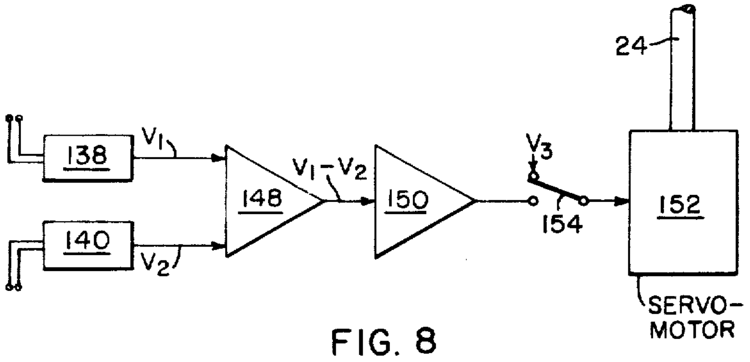
FIG. 8 is a schematic view of the lay out for the photocells, the amplifiers, and servomotor.

Another embodiment of the mechanical means 18 for rotating the masking wheel 12 and the shutter 22 is the electrical means shown in FIGS. 6, 7, and 8. The wheel 12 is provided with a plurality of spaced notches, such as a notch 136 as shown in a sector of the wheel in FIG. 6. The number of notches 136 is equal to the number of masks 42. Moreover, although the representative notch 136 is shown and described as being located at the periphery of the wheel, the notches may be openings or holes in the wheel at locations other than at the periphery.

In FIG. 7, one notch 136 is shown in cooperation with photodetector means, such as a pair of photocells 138 and 140, and a light source such as a lamp 142 and condensing lens 144. The lamp 142 is disposed below the wheel 12 where it is positioned to direct a light beam 146 toward the path of travel of the several notches 136. As one notch 136 passes through the beam 146, the photocells 138 and 140 are energized and cause the wheel 12 to stop turning.

More particularly, the central axes of the photocells 138 and 140 are spaced by a distance *w* equal to the width *w* of the notch 136. As the notch 136 moves into the path of light beam 146, one of the photocells 138 and 140 is first exposed to the beam depending upon the direction of wheel rotation. The other photocell is then increasingly exposed to the beam 146 and the first exposed cell is less exposed. As the amounts of exposure of the photocells 138 and 140 to the light beam 146 become equal, the wheel 12 stops rotating and is then in substantial alignment for the corresponding masking step.

As shown in FIG. 8 a pair of signals $V_1$ and $V_2$ are transmitted from the photocells 138 and 140 to a differential amplifier 148. So long as the photocells 138 and 140 are unequally exposed to the light beam 146, the signals $V_1$ and $V_2$ differ in value and the amplifier 148 sends a signal $V_1-V_2$ (due to the difference in the output of the photocells) to a second amplifier 150 which provides power to a servomotor 152. For that purpose a switch 154 is closed. The servomotor 152 drives the shaft 24 (FIG. 8) for turning the masking wheel 12 (FIG. 1). When the wheel 12 is to be rotated again for a subsequent masking step, the switch 154 is moved to another position where a signal $V_3$ is picked up to start the servomotor 152 to operate again. As the masking wheel 12 moves, the notch 136 passes out of the path of the light beam 146 and the switch 154 is returned to the closed circuit position between the servomotor 152 and the amplifier 150 whereafter the motor continues to turn the wheel 12 until another notch 136 affects the circuit as described above. It is manifest that the switch 154 may be actuated either manually, or automatically, by operatively connecting it to the raised position of the substrate carrier.

While the invention has been specifically described with respect to the mechanism detailed in the drawing, it can be practiced with other equivalent or similar mechanisms.

While table 12 is shown as a rotatable table, the masks 36, 38, 40 and 42 can be mounted on a linearly reciprocable table or support which is moved back and forth by a connecting rod and crankshaft mechanism operated by gear box 26. Also the resistance heating coils can be replaced with an electron beam gun.

What is claimed is:

1. Apparatus for preparing an electronic component on a substrate by vapor deposition comprising a plurality of masks arranged in a series for sequential presentment at a deposition station, means including a rotatable wheel for mounting and moving each mask sequentially into and out of the deposition station, said means for mounting and moving comprising means for rotating the wheel including a servomotor and photodetection means operatively connected to the motor and a light source associated with the photodetection means, the wheel being located between the photodetection means and the light source, the wheel having opening means therethrough for transmitting a light beam from the light source to the photodetection means, and the number of opening means being equal to the number of masks on the wheel, whereby each mask on the wheel is brought into substantial registration with the substrate material at the deposition station when the light beam activates the photodetection means, means including a housing for storing a supply of substrate material which housing has a substrate-mounting surface spaced from the deposition station, means for holding a source of material to be deposited through the masks and onto the substrate material with the source being on the side of the masks opposite that of the housing, means for moving the substrate material into and out of registry with the deposition station, means for precisely aligning the mask and the substrate material, means for moving one of the housing and frame toward and away from each other, and walls forming an evacuable chamber for containing the foregoing elements.

2. The apparatus of claim 1 wherein the substrate material is disposed between the substrate-mounting surface and the mask at the deposition station.

3. The apparatus of claim 1 wherein the means for precisely aligning the mask and substrate material comprise guide pin means and the pin-receiving aperture means.

4. The apparatus of claim 1 wherein the means for moving the housing is a lever and the housing is pivotally mounted on the lever.

5. The apparatus of claim 5 wherein the lever has bifurcated end portions over the deposition station and the housing is pivotally disposed between the bifurcated end portions.

6. The apparatus of claim 6 wherein the housing has a trunion extending from each side thereof, and the trunions are mounted in trunion-receiving notches in the bifurcated end portions.

7. The apparatus of claim 7 wherein the end portions have upper surfaces and the trunions have knife-edges mounted on the upper surfaces.

8. The apparatus of claim 8 wherein the upper surfaces have trunion-receiving notches in which the trunions are mounted for limited slideable movement.

9. The apparatus of claim 4 wherein the pin means extend downwardly from the substrate mounting surface and the guide-receiving means are pin-receiving aperture means in the frame.

10. The apparatus of claim 10 wherein the pin means include an alignment pin on opposite sides of the substrate-mounting surface, and the aperture means include an aperture on each side of the mask.

11. The apparatus of claim 11 wherein the axis of the pins are disposed in a vertical plane that passes through the axes of the trunions.

12. The apparatus of claim 12 wherein the housing moving means includes a lever having bifurcated end portions located above the deposition station, the housing is pivotally disposed between the bifurcated end portions, and the housing being mounted on the end portions for limited movement in response to alignment movement of the alignment pins with their corresponding apertures.

13. The apertures of claim 1 wherein a shutter is disposed between the source of material and the mask-mounting frame.

14. The apparatus of claim 1 wherein a shutter is disposed for intermittent movement between first and second position being in alignment with the deposition station and the source of deposition material, the second position being out of such alignment, and the means for moving the masks sequentially into and out of the deposition station being operatively connected to the shutter to place the shutter in the first position during movement of the masks and to place the shutter in the second position when each mask is at the deposition station.

15. The apparatus of claim 1 wherein the photodetection means includes a pair of spaced photocells, the centers of the photocells being spaced by a distance equal to the width of the opening means, and differential amplifier means between the photocells and the servomotor for receiving signals from the photocells and transmitting a differential signal to the motor, whereby an unequal exposure of one photocell to the light beam as compared with the other photocells causes the motor to rotate the masking wheel until the photocells are equally exposed to the light beam.

* * * * *